United States Patent [19]

Cronin

[11] Patent Number: 4,684,081

[45] Date of Patent: Aug. 4, 1987

[54] MULTIFUNCTION POWER SYSTEM FOR AN AIRCRAFT

[75] Inventor: Michael J. Cronin, Sherman Oaks, Calif.

[73] Assignee: Lockheed Corporation, Calabasas, Calif.

[21] Appl. No.: 873,026

[22] Filed: Jun. 11, 1986

[51] Int. Cl.[4] ............................................. B64D 41/00
[52] U.S. Cl. .................................... 244/58; 244/118.5; 244/53 A; 98/1.5; 62/DIG. 5; 60/39.141
[58] Field of Search ............... 244/53 A, 58, 118.5; 98/1.5; 60/39.141, 39.142, 39.07; 62/DIG. 5

[56] References Cited

U.S. PATENT DOCUMENTS

| | | | |
|---|---|---|---|
| 2,491,462 | 12/1949 | Wood | 98/1.5 |
| 2,777,301 | 1/1957 | Kuhn | 98/1.5 |
| 3,662,975 | 5/1972 | Driskill | 244/58 |
| 4,091,613 | 5/1978 | Young | 98/1.5 |

FOREIGN PATENT DOCUMENTS

| | | | |
|---|---|---|---|
| 632732 | 12/1949 | United Kingdom | 244/58 |
| 1316275 | 5/1973 | United Kingdom | 244/58 |

Primary Examiner—Joseph F. Peters, Jr.
Assistant Examiner—Rodney Corl
Attorney, Agent, or Firm—Louis L. Dachs

[57] ABSTRACT

The multifunction power system is a combination auxiliary power unit, environmental control system, engine start system, and emergency power system for an aircraft. The system is essentially a four-wheel auxiliary power unit comprising two compressors driven by one turbine by means of a common shaft and in addition a free turbine. The pressurized flow from the second compressor can be directed to parallel combustors and thereafter to the two turbines. A starter-generator and motor are coupled to the compressor drive shaft and the free turbine is used to power a generator and for engine starting. Ducts, heat exchangers, valves, etc., are so arranged as to provide the four functions by proper selection and routing of air.

10 Claims, 5 Drawing Figures

MULTIFUNCTION POWER SYSTEM FOR AN AIRCRAFT

TECHNICAL FIELD

The invention relates to the field of secondary power systems for an aircraft and, in particular, to an integrated auxiliary power unit, environmental control system, engine start system, and emergency power system for an aircraft.

BACKGROUND INFORMATION

In modern high-speed aircraft, weight, space, and costs are highly important. Also, there is a heavy emphasis on the reliability and maintenance support aspects of the systems in these aircrafts since the reliability and maintenance impacts strongly on the availability and sortie rates of aircraft. Pursuant to this, a reduction of part counts and a reduction in complexity are key to the achievement of the high-reliability and low-maintenance criteria. Thus, the integration of the auxiliary power unit (APU), emergency power unit (EPU), environmental control system (ECS), and engine start system (ESS) with a correspondent reduction in the number of parts, weight and size is highly desirable. This is particularly true in that the APU is considered by the airlines and the military to be a low-utilization device that adds weight, complexion, and maintenance support to the airplane; also, it is considered as one that has little operational benefit during most flight conditions. For these reasons, the APU is not a welcome addition to the airplane; but, it is one that is essential thereto when independence of ground support power for engine starting, environmental control, and electrical power functions is necessary. Certainly in any advanced fighter-type aircraft which is subject to bare site dispersal and has to scramble rapidly, the APU system is inevitable.

The complexity of such elements of the secondary systems are readily apparent when viewing the prior art. Typical military aircraft use airframe mounted accessory drives (AMAD) mechanically coupled to the main engines for driving hydraulic pumps, electric generators, and other accessories. A separate EPU is then often provided which uses either a pressurized air bottle or mono/bi-propellant fuel to drive an air turbine motor inlet coupled to a generator and hydraulic pumps for emergency flight loads. The main APU itself is normally a ground-use unit which drives an electric generator, hydraulic pumps; and typically an air compressor to supply pressurized air for air conditioning and avionic cooling loads.

Some prior efforts have been made to integrate the functions of the APU and EPU to maximize the role of the various components thereof, as they have met some degree of success. An additional advantage offered by such integration is that a single-type energy power source such as aviation fuel could be used for the EPU as well as the APU. However, the shortcomings of these prior art systems are that there is still a good deal of component replication and the mechanical integration of the APU/EPU system was complex. Furthermore, the operational aspects of the systems in regard to engine starting and ground checkout are very protracted and inefficient.

Therefore, it is a primary object of the subject invention integrate the auxiliary power unit, the environmental control system, the emergency power unit, and the engine start system so as to improve reliability, reduce parts duplication, minimize maintenance support, and finally to reduce the size and weight of the aircraft.

It is a further object of the subject invention to integrate the above-mentioned systems so as to offset the low utilization factor problems of the conventional auxiliary power and emergency power units.

DISCLOSURE OF THE INVENTION

The invention is a secondary power system for an aircraft wherein the functions of the auxiliary power unit, environmental control system, engine start system, and emergency power unit are all integrated to provide an overall reduction in components. In detail, the invention includes a compressor means having an inlet coupled to the exterior of the aircraft and which is connected by a drive shaft to a first turbine. The compressor means comprises first and second variable inlet guide vane compressors in series with a by-passable heat exchanger mounted therebetween. Additionally, an electric motor and a starter-generator (functioning dually as a motor and a generator) are connected to the same drive shaft. The system incorporates a first duct assembly having a first end coupled to the outlet of the compressor means and a second end which is bifurcated with one leg coupled overboard and the other leg coupled to the compartments on board the aircraft requiring conditioned air. The first duct assembly couples a first outside air-cooled heat exchanger means, a first combustor, and a second turbine (isolated from the first turbine) in series and, additionally, includes a second outside air-cooled heat exchanger means mounted in the second leg thereof. The second turbine is coupled by a drive shaft to a generator and, additionally, to the engine via a clutch.

The system further includes second and third duct assemblies. The second duct assembly also has a first end connected to the outlet of the compressor means and a bifurcated second end with a first leg thereof connected to the first duct assembly and a second leg coupled overboard. This second duct assembly couples a second combustor and the first turbine in series. An auxiliary pressurized air supply is also coupled thereto. The third duct assembly has a first end connected to the compartments and a second end having a first leg coupled to the first duct assembly downstream of the first combustor, a second leg coupled to the second duct assembly downstream of the second combustor, and a third leg coupled overboard.

Various valve means are incorporated into the system to control the flow path of air and combustion products which include: (1) A first control valve means for controlling the flow from the outlet of the compressor means to the first and second duct assemblies; (2) a second control valve means mounted in the first duct assembly for controlling the flow to first and second legs thereof; (3) a third control valve means coupled to the second duct assembly for controlling flow to and between the first and second legs thereof; (4) a fourth control valve means for controlling the flow in the first duct assembly from the first leg of the third duct assembly; (5) a fifth control valve means for controlling the flow from the second duct assembly and from the second leg of the third duct assembly; and finally, (6) a sixth control valve means for controlling the flow in the third leg of the third duct assembly.

The system essentially has five modes of operation.
1. APU Mode

In this mode, the starter-generator (in the starter mode) is used to bring the compressor means and first turbine up to a speed wherein combustion of fuel in the second combustor is effected and the compressor means and first turbine are brought up to full operating speed. At this point, the starter-generator is switched to the generator mode and furnishes electrical power to the aircraft for checkout purposes. The exhaust gases from the first turbine are ducted by the third control valve means overload via the second leg of the second duct assembly.

2. Ground Cooling Mode

Air from the compressor means is now additionally ducted to the first duct assembly through the first heat exchanger means for cooling and then through to the second turbine where it is also cooled, i.e., the second turbine absorbs energy and is loaded by the generator coupled thereto.

The air is passed through the second heat exchanger means in the first leg of the first duct assembly where it is further cooled and finally into the various compartments requiring cooling. Return flow from the compartments is directed overboard through the third duct assembly (third leg). In this mode, the generator powered by the second turbine provides some or all of the electrical power.

3. Engine Start Mode

In this mode, fuel is added to the first combustor and ignited, the first heat exchanger means is bypassed, and the flow in the first duct assembly is directed to the second turbine and thereafter overboard. The second turbine is, thereafter, coupled to the engine for starting purposes. The second combustor remains "on" and the first turbine continues to drive the starter-generator.

4. Flight Cooling Mode

With the engines running, the motor (powered by engine driving generators) is now used to drive the compressor means and first turbine. The heat exchanger means between the first and second compressors is used to cool the output air from the first compressor. The further compressed output air from the second compressor is passed through the first and second heat exchangers and into the compartments normally bypassing the second turbine. In "hot-day" operations, some or all of the air may be directed through the second turbine wherein the air is further cooled. Return air from the compartments is ducted to the first turbine where it does work thereon prior to being dumped overboard, thus offloading the motor.

5. Energy Power Engine Start

Should the engines flame out or otherwise fail when the aircraft is in the flight cooling mode, or the engine generators alone fail, the source of high pressure air is fed to the first combustor along with fuel which is ignited providing hot gas to drive the second turbine which in turn drives the generator. The generator is then coupled to the motor to bring the compressor means and first turbine back up to speed. Thereafter, fuel is added to the second combustor and ignited (the first combustor remains in operation but is now fed by the compressor means). Thus, the starter-generator (in the generator mode) now provides power and the second turbine can now be coupled to the engine to attempt a restart.

The novel features which are believed to be characteristic of the invention, both as to its organization and method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a schematic representation of the multifunction power system shown in the ground start mode.

Illustrated in FIG. 2 is a schematic representation of the multifunction power system in the ground cooling mode.

Illustrated in FIG. 3 is a schematic representation of the multifunction power system in the engine start mode.

Illustrated in FIG. 4 is a schematic representation of the multifunction power system in the flight cooling mode.

Illustrated in FIG. 5 is a schematic representation of the multifunction power system in the emergency power mode.

BEST MODE FOR CARRYING OUT THE INVENTION

Figure 1:
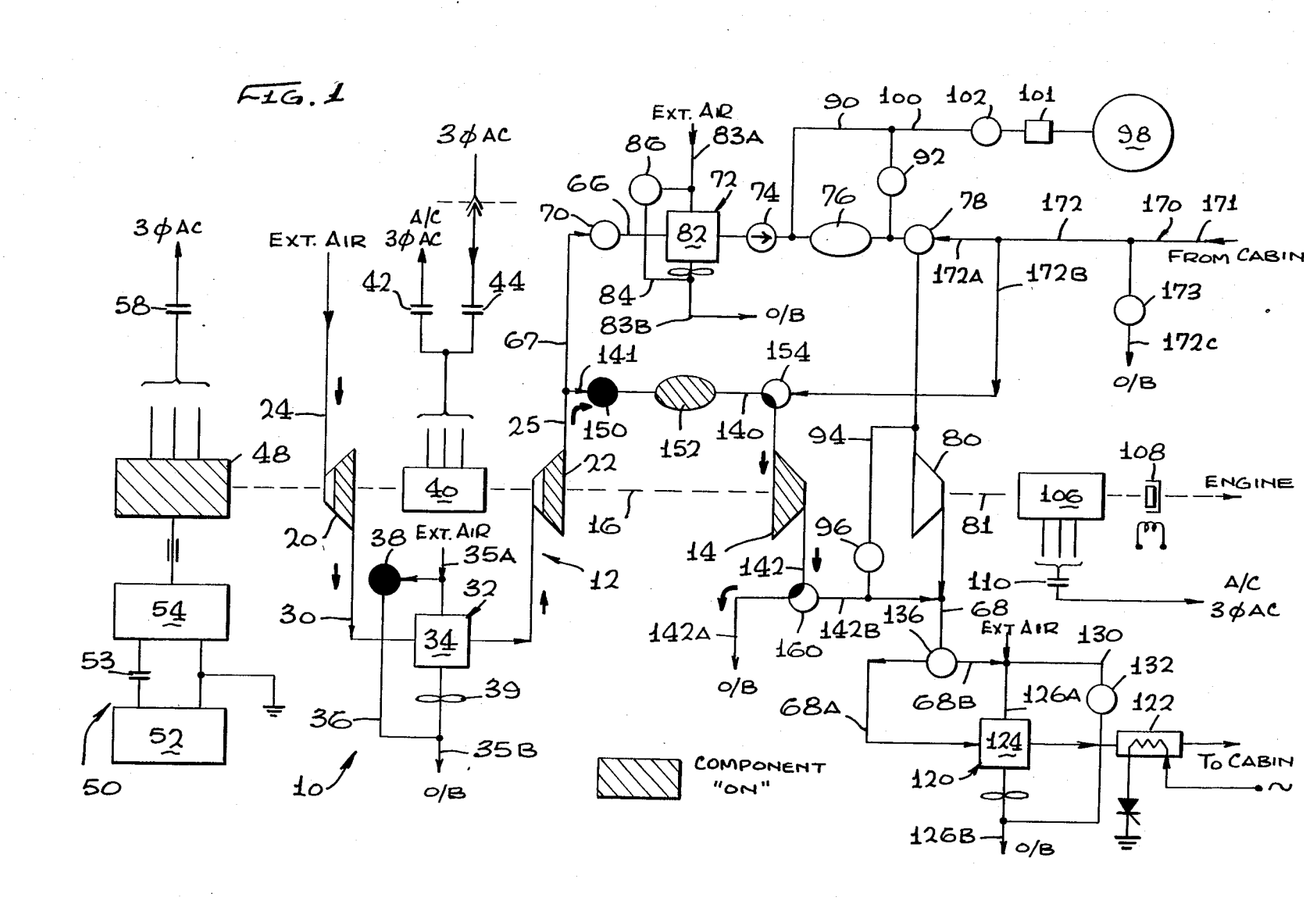

Illustrated in FIG. 1 is a schematic representation of the multifunction power system for an aircraft, generally designated by numeral 10, shown in the auxiliary power unit mode. The system 10 comprises a compressor means 12 coupled to a first turbine 14 by means of a drive shaft 16. The compressor means 12 includes first and second compressors 20 and 22, respectively, coupled to the drive shaft 16. These compressors are preferably centrifugal type with variable inlet guide vanes. The inlet 24 to the first compressor 20 is coupled to the exterior of the aircraft and the compressor 22 has an outlet 25. The compressors 20 and 22 are coupled in series by duct 30 in which is mounted a heat exchanger means 32. The heat exchanger means 32 includes an air-cooled heat exchanger 34 having an air inlet duct 35A and air outlet duct 35B. A bypass duct 36 incorporating a control valve 38 couples duct 35A directly to duct 35B bypassing heat exchanger 34. The heat exchanger 34 uses ram air when the aircraft is at a speed for cooling incoming compressed air from compressor 20, while on the ground a fan 39 is used to draw air therethrough. The control valve 38 can be modulated to control the degree of cooling effected by the heat exchanger 34. All the subsequent heat exchangers described herein operate in the same manner.

Mounted between the two compressors 20 and 22 and coupled to the drive shaft 16 is an AC motor 40 (preferably a two-speed, squirrel-cage induction type) electrically coupled by relays 42 and 44 to internal or external power via three-phase AC power lines, respectively. While shown mounted between the two compressors it could be coupled to the drive shaft elsewhere.

A starter-generator 48, which functions dually as a motor and a generator, is coupled to the drive shaft 16 outboard of the compressor 20. Here again, the starter-generator is shown in this position for purposes of illustration only and, thus, it could be located in a different location. In the start mode it is electrically connected to a battery circuit 50, which includes a battery 52, a relay 53, and a three-phase inverter 54. Additionally, the starter-generator can be coupled to internal three-phase circuitry via relay 58 when in the generator mode.

A duct assembly 66 having a first end 67 is coupled to the outlet 25 of the compressor 22 by its first end 67 and has a bifurcated second end 68. Mounted in series in the duct assembly 66 are a flow modulating control valve 70, a heat exchanger means 72, a check valve 74, a combustor 76, a selector control valve 78, and a second turbine 80. The heat exchanger means 72 includes an air-cooled heat exchanger 82 having a cooling air inlet duct 83A and a cooling air outlet duct 83B. A by-pass duct 84 having a control valve 86 mounted therein couples duct 83A directly to duct 83B bypassing heat exchanger 82. A by-pass duct 90 with a control valve 92 mounted therein is coupled upstream of the combustor 76 and downstream thereof in order that the combustor 76 may be bypassed in certain modes of operation (to be subsequently discussed). The turbine 80 can be bypassed by means of a by-pass duct 94 with a modulating control valve 96 mounted therein. A pressurizable tank 98 is coupled by a line 100, to the duct assembly 66 between the check valve 74 and combustor 76 and incorporates a pressure regulator 101 and a control valve 102 mounted in series therein. As illustrated, it is coupled to the by-pass duct 90 between duct assembly 66 and valve 92.

The turbine 80 is coupled by shaft 81 to an AC generator 106 and thereafter to an engine (not shown) via a clutch 108. The generator 106 provides electrical power to the aircraft and is controlled by a three-phase relay 110. The second end 68 of the duct assembly 66 has a first leg 68A which is coupled to the one or more compartments of the aircraft requiring conditioned air and mounts a heat exchanger means 120 and an electrical heater 122 in series therein. The heat exchanger means 120 includes an outside air-cooled heat exchanger 124 having an inlet duct 126A and an outlet duct 126B. A by-pass duct 130, having a control valve 132 mounted therein, is coupled at one end to the inlet duct 126A and the other end to the outlet duct 126B, thus allowing cooling air to bypass the heat exchanger 124. A second leg 68B of the duct assembly 66 is coupled to duct 126A of the heat exchanger means 120. A selector control valve 136 is used to control the flow between legs 68A and 68B.

A second duct assembly 140 has a first end 141 coupled to the outlet 25 of the compressor 22 and a bifurcated second end 142 and couples a modulating control valve 150, a combustor 152, a selector control valve 154, and the turbine 14 in series. The second end 142 mounts a selector control valve 160 for controlling the flow to leg 142A which is coupled overboard and leg 142B which is coupled to duct assembly 66 just downstream of turbine 80 via by-pass duct 94.

A third duct assembly 170 having a first end 171 is coupled to the compartments and has a three branch second end 172 comprising a first leg 172A coupled to a selector valve 78, a second leg 172B coupled to selector valve 154, and a third leg 172C', having a control valve 173 mounted therein, coupled overboard. Thus, control valves 68 and 154 not only control the flow in duct assemblies 66 and 140, respectively, but also the return flow from the compartments.

Following is a description of the various modes of operation of the above-described multifunction power system:

(1) APU—GROUND OPERATION

Still referring to FIG. 1 which, as previously stated, is a schematic representation illustrating the system in the APU ground operation mode. The relay 53 is closed connecting the starter-generator 48 to the battery 52 via inverter 54. Here, the starter-generator 48 acts as a starter. This will cause the compressors 20 and 22 and turbine 14 to start up. Because the compressed air from the compressor means 12 will not be used for cooling the compartments, the by-pass valve 38 is open allowing the flow to bypass the heat exchanger 34. The valve 150 is open and valve 154 is positioned to coupled combustor 152 to the turbine 14. Valve 160 is positioned to couple the output of the turbine 14 overboard via leg 142A of the duct 140. When the speed is high enough to produce sufficient pressure, fuel is injected into the combustor 152 and ignited, thus, providing high energy gas to the turbine 14 which will now drive the compressors 20 and 22. At this point, relay 53 is opened and relay 58 is closed and the starter-generator 48 now operates as a generator. Thus, the turbine 14 driving the starter-generator 48 provides the aircraft with all the electrical power necessary for preflight checkout.

(2) GROUND COOLING

Figure 2:
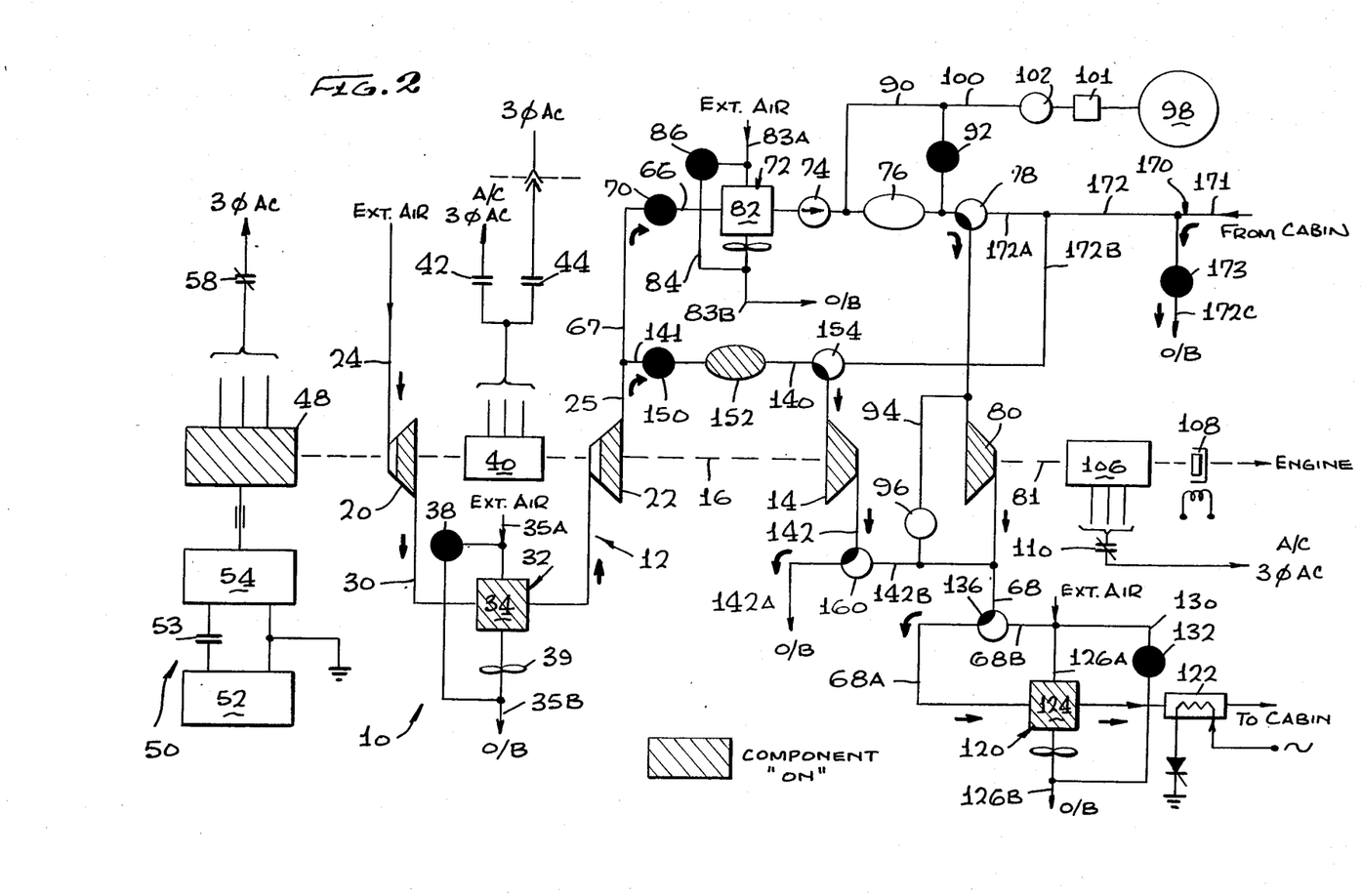

With the aircraft on the ground and the engines not started it will not only be necessary to supply electrical power to the aircraft, but also to cool the various compartments on board the aircraft requiring conditioned air. This may include the flight station and the various avionics equipment bays, etc. Referring to FIG. 2, which is a schematic representation of the system in a ground cooling mode, it can be seen that the system is still operating in the ground APU mode; but, more fuel is added to the combustor 152, increasing the output from the compressor means 12. The heat exchanger means 34 is in operation and is used to cool the output air from compressor 20. The by-pass valve 38 is used to regulate the amount of cooling by controlling the amount of air bypassing the heat exchanger 34 through duct 36. Valve 70 is brought into operation to modulate the flow of air to duct assembly 66. Here, the amount of cooling by the heat exchanger 82 is controlled by the position of by-pass valve 86 in duct 84. Valve 92 in by-pass duct 90 is opened allowing the air to bypass the combustor 76. The combustor 76 is bypassed to prevent any residue fuel or combustion air products therein from reaching the compartments. Valve 78 is set to direct the pressurized flow to the turbine 80 with flow therethrough controlled by valve 96 in by-pass duct 94. Valve 136 is set to direct the flow from the turbine 80 through leg 68A including heat exchanger means 124 to the compartments requiring the conditioned air. Air passing through the turbine 80 is further cooled by absorbing energy therefrom. The energy absorbed by the turbine is used to drive generator 106 providing some or all the electrical power (relay 110 is closed coupling the generator 106 to the aircraft's electrical circuits). The air then passes through heat exchanger 124, where it is further cooled and then into the compartments. Here again, the amount of cooling by heat exchanger 120 is controlled by valve 132 in by-pass duct 130. Return air from the compartments is ducted overboard via leg 172C' of duct assembly 170, i.e., valve 173 is open. Thus, great leeway is provided in optimizing the temperature of incoming air to the compartments by modulating the air flow through heat exchanger means 32, 72, and 120 and also controlling the bypass air around turbine 80, via by-pass duct 94 and valve 96.

(3) ENGINE START MODE

Figure 3:
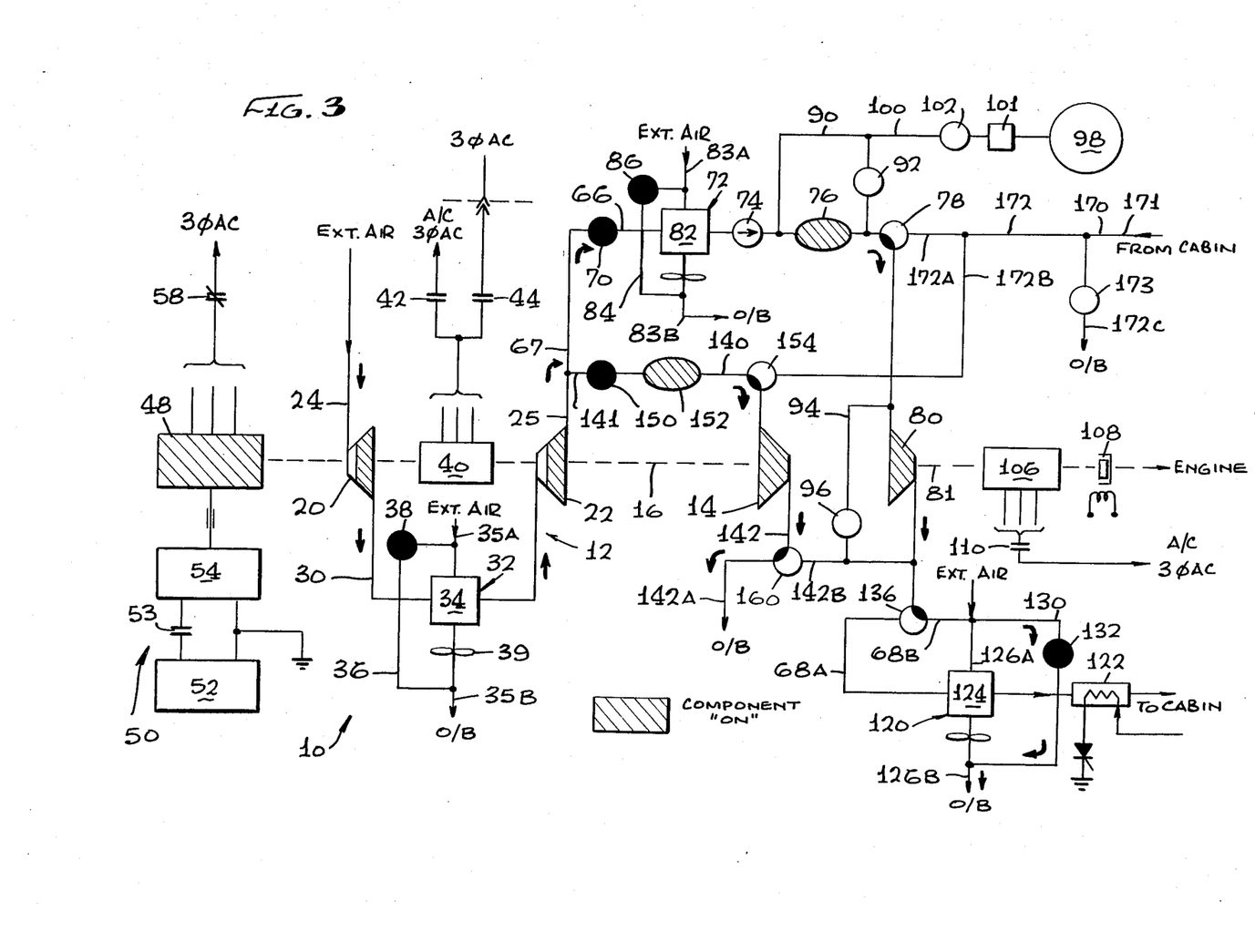

Referring to FIG. 3, which is a schematic representation of the system in the engine start mode, to start the engines with the system in the configuration illustrated in FIG. 2, fuel is added to combustor 76 which is ignited. Also note that, incoming air to heat exchanger 34 between the two compressors is now also bypassed since no cooling of the compartments is contemplated during engine start. Generator 106 is disconnected via relay 110 and the clutch 108 is engaged coupling the turbine 80 to the engine for starting. Valve 96 in by-pass duct 96 is closed, directing all the hot gases to the turbine 80. Air exiting the turbine 80 is directed by valve 136 to second leg 68B of duct assembly 66, to by-pass duct 130 (valve 132 is in the open position). In this mode, with both combustors 76 and 152 producing hot gas, the electrical power to the aircraft is provided by starter-generator 48.

(4) FLIGHT COOLING

Referring to FIG. 4, which is a schematic representation of the system in the flight cooling mode, it can be seen that with the engines running, relay 44 is closed, coupling the motor 40 to electrical power from engine driven generators (not shown) which in turn drives the starter-generator 48 (operating in the generator mode), compressors 20 and 22, and turbine 14. The heat exchanger means 32 is in use as well as both heat exchanger means 72 and 120. Valve 70 is used to modulate flow in duct assembly 66 (valve 150 in duct 140 is closed). The combustor 76 is bypassed by opening valve 92 in by-pass duct 90. Valve 78 is positioned to direct air to the turbine 80 wherein further cooling takes place because of the expansion of the air through the turbine. Flow through the turbine 80 is modulated by valve 96. Here, the generator 106 can be put on-line to load the turbine 80 by closing relay 110 if the turbine 80 is used for cooling. Thereafter, the air is directed by valve 136 through heat exchanger means 124 to the compartments. Return air passes through leg 172B of duct assembly 170 and is directed through turbine 14 via valve 154 and thereafter overboard. Thus, the return air expands through the turbine 14 producing power and reducing the load on the motor 40. The heater 122 can be brought on-line to heat the air entering the compartments when the aircraft is at high altitude and the outside air is extremely cold. With the heater 122 on the heat exchangers means 32, 72, and 120 are normally inoperative.

(5) EMERGENCY POWER MODE/ENGINE RESTART

Figure 5:
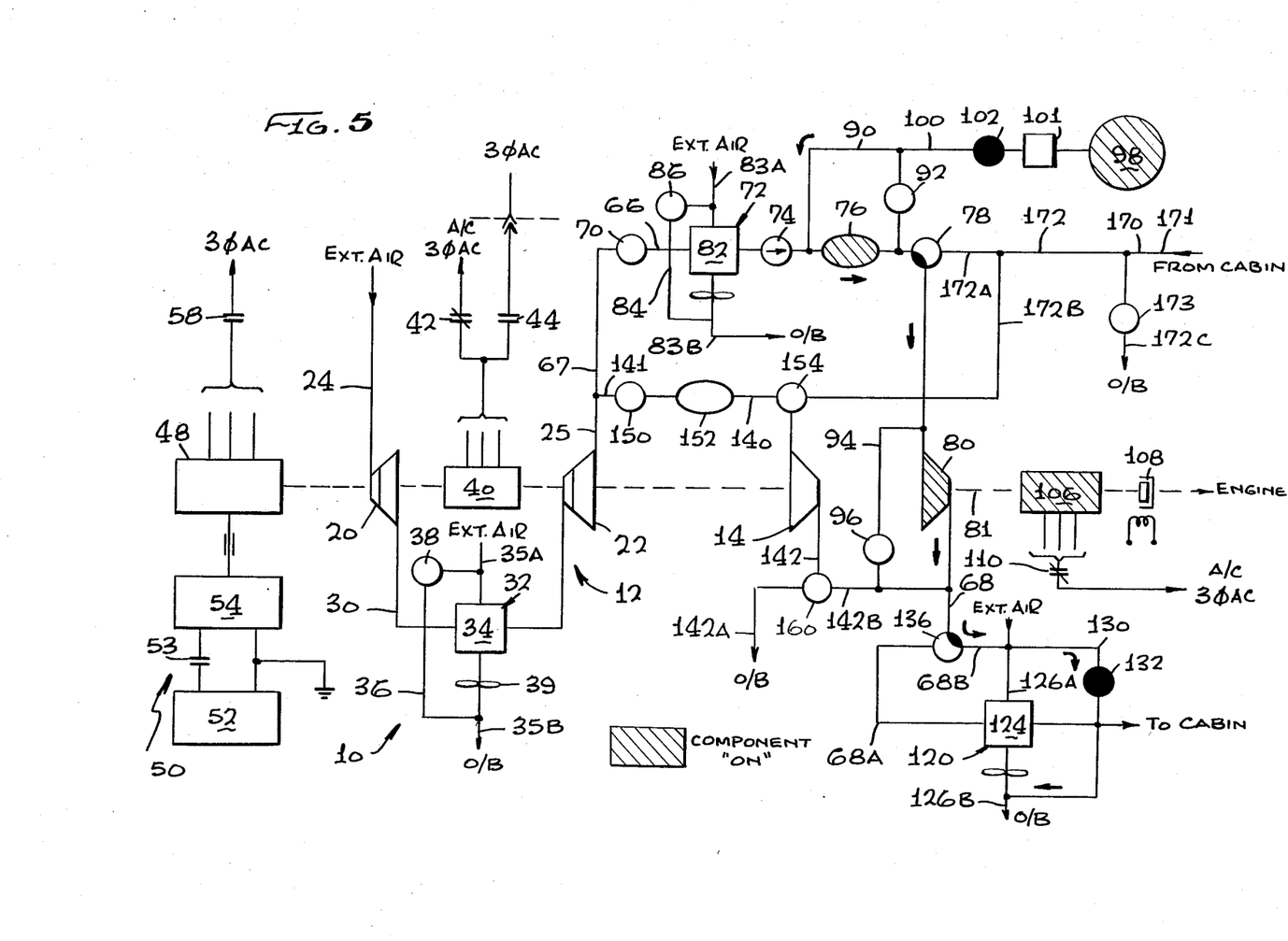

Referring to FIG. 5, which is a schematic representation of the system in the emergency power mode, and assuming that the system is in the flight cooling mode as illustrated in FIG. 4, the loss of engine power will deprive motor 40 of electrical power. The compressors 20 and 22 and turbine 14 will immediately start to slow down. Upon sensing this event (by means not shown), valve 102 is opened allowing pressurized air from bottle 98 regulated by pressure regulator 101, to pass into duct assembly 66 downstream of check valve 74 and into combustor 76. Note that the check valve 74 prevents flow toward the compressor means 12. Fuel is added to the combustor 76 and ignited. The valve 78 is set to direct the hot gas to turbine 80 (by-pass valve 96 is closed), and the generator 106 is brought up to speed. The output from generator 106 (relay 110 is closed) is then used to power systems necessary to control the aircraft so that it can be brought down from altitude and landed with power. Alternately, the electrical power from the generator 106 can be fed to motor 40 to bring the compressors 20 and 22 and turbine 14 back up to speed. Thereafter, combustor 152 can be brought back on-line. At this point, the aircraft can be switched back into the ground APU mode as illustrated in FIG. 1 and, thereafter, the engine start procedure, as previously outlined, can be initiated. Alternately, the battery can be used to power the starter-generator 48 (in the starter mode) to bring the compressors 20 and 22 and turbine 14 back up to speed.

Thus, it is readily apparent that the system can provide some or all of the secondary power requirements of the aircraft. While the invention has been described with reference to a particular embodiment, it should be understood that the embodiment is merely illustrative, as there are numerous variations and modifications which may be made by those skilled in the art. Thus, the invention is to be construed as being limited only by the spirit and scope of the appended claims.

Industrial Applicability

The invention has applicability on aircraft and in particular on aircraft using electrically operated secondary power systems.

I claim:

1. A multifunction power system for an aircraft, the aircraft having at least one engine and at least one compartment requiring conditioned air, the system comprising:

a drive shaft;
a compressor means coupled to said drive shaft, said compressor means having an inlet coupled to the exterior of the aircraft and an outlet;
a first turbine coupled to said drive shaft for driving said compressor means;
an electric motor coupled to said drive shaft;
a starter-generator coupled to said drive shaft;
a first duct assembly having a first end coupled to said outlet of said compressor means and a bifurcated second end with one leg thereof coupled overboard and a second leg thereof coupled to said at least one compartment, said first duct assembly mounting a first outside air-cooled heat exchanger means, a first combustor, and a second turbine in series, and further mounting a second outside air-cooled heat exchanger means in said second leg;
a second duct assembly having a first end coupled to said outlet of said compressor means and a bifurcated second end with a first leg thereof coupled to said first duct assembly and a second leg thereof coupled overboard, said second duct assembly coupling a second combustor and said first turbine in series;
a third duct assembly having a first end coupled to said compartment and a second end having a first leg coupled to said first duct assembly, a second leg coupled to said second duct assembly, and a third leg coupled overboard;
a first control valve means for controlling the flow from said outlet of said compressor means to said first and second duct assemblies;
a second control valve means mounted in said first duct assembly for controlling the flow to and between said first and second legs thereof;
a third control valve means coupled to said second duct assembly for controlling flow to and between said first and second legs thereof;

a fourth control valve means for controlling the flow in said first duct assembly and from said first leg of said third duct assembly;

a fifth control valve means for controlling the flow in said second duct assembly and from said second leg of said third duct assembly; and a sixth control valve means for controlling the flow in said third leg of said third duct assembly.

2. The system as set forth in claim 1 wherein said compressor means comprises:

first and second compressors coupled to said drive shaft; and a fourth duct assembly coupling said first and second compressors in series.

3. The system as set forth in claim 2 wherein said compressor means further includes a third heat exchanger means mounted in said fourth duct assembly.

4. The system as set forth in claim 3 wherein said system further comprises:

a check valve mounted in said first duct assembly between said first heat exchanger means and said first combustor; and an air supply means coupled to said first duct assembly between said check valve and said first combustor.

5. The system as set forth in claim 4 wherein said first valve means comprises first and second modulating control valves in said first and second duct assemblies.

6. The system as set forth in claim 5 wherein said air supply means comprises:

a pressurized air container;

a fifth duct assembly coupling said container to said first duct means;

a valve mounted in said fifth duct assembly for controlling the flow of air from said container; and a pressure regulator mounted in said fifth duct assembly for controlling the pressure level of air from said air container reaching said first duct assembly.

7. The system as set forth in claim 6 further including:

a sixth duct assembly having a first end coupled to said first duct assembly upstream of said second turbine and a second end coupled downstream of said second turbine; and a valve mounted in said sixth duct assembly for controlling the flow therein.

8. The system as set forth in claim 7 wherein said first, second, and third heat exchanger means comprises:

outside air-cooled heat exchangers;

by-pass ducts for ducting outside air around said heat exchangers; and valves mounted in said by-pass ducts for controlling the flow of air therethrough.

9. The system as set forth in claim 8 wherein said system further includes a heater mounted in said first leg of said first duct assembly downstream of said second heat exchanger means.

10. The system as set forth in claim 9 wherein the system further includes:

said second turbine coupled to the engine by means of a second drive shaft; and clutch means mounted to said drive shaft for decoupling said second turbine from the engine.

* * * * *